(No Model.)
C. H. SHEPARD.
HOOF EXPANDER.
No. 373,380. Patented Nov. 15, 1887.
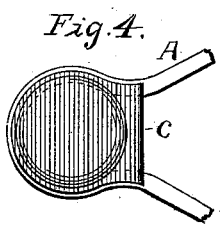
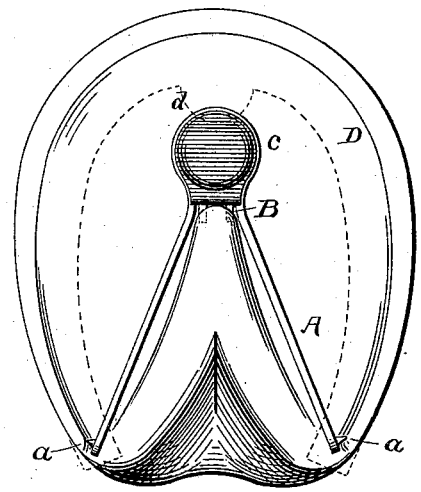
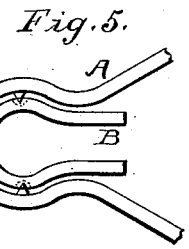
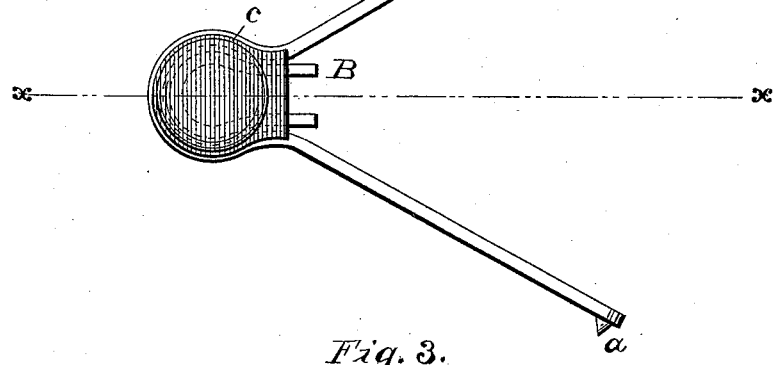
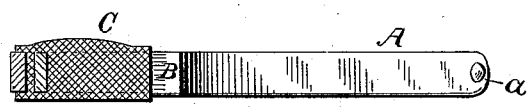
WITNESSES:
Adolphus D. Pape
John O. Smeetser
INVENTOR
Charles Henry Shepard
per Samuel Campbell
ATTORNEY
N. PETERS, Photo-Lithographer, Washington, D. C.

UNITED STATES PATENT OFFICE.

CHARLES HENRY SHEPARD, OF NORTH PLAINFIELD, NEW JERSEY.

HOOF-EXPANDER.

SPECIFICATION forming part of Letters Patent No. 373,380, dated November 15, 1887.

Application filed April 13, 1887. Serial No. 234,573. (No model.)

*To all whom it may concern:*

Be it known that I, CHARLES HENRY SHEPARD, a citizen of the United States, and a resident of North Plainfield, in the county of Union and State of New Jersey, have invented a certain new and useful Improvement in Hoof-Expanders, of which the following is a specification, reference being had to the accompanying drawings.

Figure 1 is the bottom of a hoof with my expander in position. Fig. 2 is a plan view of my expander. Fig. 3 is a vertical longitudinal section of same on line $x\ x$ of Fig. 2. Figs. 4 and 5 are modified forms of my hoof-expander.

Similar letters of reference indicate corresponding parts.

My invention relates to an improvement in device for expanding hoofs of horses and for preventing and curing all lameness caused by contraction thereof; and it consists in certain improvements upon the devices for which Letters Patent were granted me September 26, 1876, No. 182,608, and March 25, 1879, No. 213,592.

A represents expanding-spring, of steel or other substance, substantially as used in my former patents, to which I convey greater elastic and expanding power and strength at point of greatest strain by adding an inner strengthener or support of rubber, steel, or other elastic substance, or of rubber or other elastic substance and steel combined.

I prefer to use the inner spring, B, combined with and embedded in rubber C, by which it is held in position, as shown in Figs. 2 and 3. I can, however, use the inner spring, B, without the rubber or other elastic material by any suitable means of attachments, as shown in Fig. 5; or I can use the rubber or other elastic material, C, without the spring, as shown in Fig. 4.

The spring A, as in my former patents, above referred to, is placed so as to extend along the sides of frog, and is held in position at heel by being sprung in in such a manner that the prongs $a$ are forced by the pressure of the spring into the shell of the hoof at that part, while the ends of the inner spring, B, can be passed under the frog and retain the expander in position at that point, as shown by dotted lines in Fig. 1. In case the frog is so defective that the ends of the spring B will not hold, the shoe D can be formed with a clip, $d$, to pass over the end of expander, as also shown by dotted lines in Fig. 1, and thus secure the same. This construction of the expander furnishes one having much greater strength and expanding powers than those in my former patents, and one that is more easily adjusted, and the inner spring, which takes place of the wedge heretofore used, when used with the rubber attachment, presents, instead of a solid, a flexible surface, and prevents all danger of injury to sole of foot, and also is a great preventive to the horses' feet balling with snow.

Having thus described my invention, what I wish to claim and secure by Letters Patent is—

1. An improved hoof-expander consisting of spring A, with prongs $a\ a$, adapted to be secured to bottom of hoof, having an inner strengthener or support composed of spring B and rubber or other elastic attachment, C, as described, and for purposes set forth.

2. A hoof-expanding device composed of outer spring, A, of form set forth, and an inner spring, B, attached substantially as set forth, for uses and purposes described.

3. A hoof-expanding device composed of expanding-spring A, of form set forth, and an elastic strengthener or support, C, substantially as set forth.

4. In hoof-expanders, an inner spring to convey strength and elastic power at point of greatest strain.

Signed at New York city, in the county of New York and State of New York, this 31st day of March, A. D. 1887.

CHARLES HENRY SHEPARD.

Witnesses:
   A. A. CAULDWELL,
   ADOLPHUS D. POPE.